(12) United States Patent
Zhang et al.

(10) Patent No.: US 8,582,968 B2
(45) Date of Patent: Nov. 12, 2013

(54) METHOD, APPARATUS AND SYSTEM FOR ADVERTISING ROUTING PROTOCOL MESSAGE AND CALCULATING ROUTE

(75) Inventors: Fatai Zhang, Shenzhen (CN); Jianrui Han, Shenzhen (CN); Yi Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/219,119

(22) Filed: Aug. 26, 2011

(65) Prior Publication Data

US 2012/0063779 A1    Mar. 15, 2012

Related U.S. Application Data

(63) Continuation of application No. PCT/CN2010/070638, filed on Feb. 11, 2010.

(30) Foreign Application Priority Data

Feb. 26, 2009    (CN) .......................... 2009 1 0006862

(51) Int. Cl.
*H04J 14/00*    (2006.01)

(52) U.S. Cl.
USPC .................. 398/57; 398/58; 398/66; 398/68; 398/50; 398/56

(58) Field of Classification Search
USPC ........... 398/57, 58, 66, 42–47, 25, 59, 68, 50, 398/56
See application file for complete search history.

(56) References Cited

U.S. PATENT DOCUMENTS

2003/0218988 A1    11/2003    Han et al.
2008/0170856 A1*   7/2008    Shi et al. ........................ 398/50

FOREIGN PATENT DOCUMENTS

| CN | 101155064 A  | 4/2008 |
| CN | 101163090 A  | 4/2008 |
| KR | 20040051737 A| 6/2004 |

OTHER PUBLICATIONS

Partial Translation of Office Action dated Oct. 10, 2012 in connection with Chinese Patent Application No. 200910006862.4.
Supplementary European Search Report dated Mar. 29, 2012 in connection with European Patent Application No. EP 10 74 5816.
G. Martinelli, et al., "GMPLS Signaling Extensions for Optical Impairment Aware Lightpath Setup", Internet Engineering Task Force, Feb. 22, 2008, 19 pages.
D. Li, et al., "Evaluation of Possible Interior Gateway Protocol Extensions for Wavelength Switching Optical Networks", Network work group, Jul. 11, 2008, 16 pages.
Y. Lee et al., "Framework for GMPLS and PCE Control of Wavelength Switched Optical Networks (WSON)", Network Working Group, Feb. 9, 2009, 47 pages.

(Continued)

*Primary Examiner* — M. R. Sedighian

(57) ABSTRACT

A method, apparatus and system for advertising a routing protocol message and calculating a route are provided which solve the problems that the time of connection establishment or rerouting in wavelength routing is too long and that wavelength utilization efficiency is low. The method for advertising the routing protocol message includes: obtaining node information and link information of a node, in which the node information contains port cross-connection capability information of the node, and the link information contains wavelength restriction information and wavelength status information of each link connected to the node; carrying the obtained node information and link information in a Type-Length-Value object of a routing protocol message, and advertising the routing protocol message in the network.

11 Claims, 13 Drawing Sheets

(56) References Cited

OTHER PUBLICATIONS

International Search Report dated May 20, 2010 in connection with PCT Application No. PCT/CN2010/070638.
Written Opinion dated May 20, 2010 in connection with PCT Application No. PCT/CN2010/070638.
G. Bernstein, et al., "Routing and Wavelength Assignment Information Encoding for Wavelength Switched Optical Networks", Dec. 18, 2008, 19 pages.
G. Bernstein, et al., "Routing and Wavelength Assignment Information Model for Wavelength Switched Optical Networks", Nov. 3, 2008, 15 pages.
R. Aggarwal, et al., "Advertising a Router's Local Addresses in OSPF TE Extensions", Nov. 18, 2008, 8 pages.
Partial translation of Office Action dated May 9, 2013 in connection with Chinese Patent Application No. 200910006862.4.

* cited by examiner

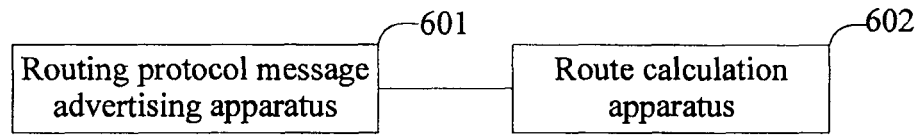

FIG. 6

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Connectivity  |                  Reserved                    |
+-+-+-+-+-+-+-+-+-+-+-+-+-+-+-+-+-+-+-+-+-+-+-+-+-+-+-+-+-+-+-+-+
|                       Link Set In #1                          |
:                              :                                :
+-+-+-+-+-+-+-+-+-+-+-+-+-+-+-+-+-+-+-+-+-+-+-+-+-+-+-+-+-+-+-+-+
|                       Link Set Out #1                         :
:                              :                                :
+-+-+-+-+-+-+-+-+-+-+-+-+-+-+-+-+-+-+-+-+-+-+-+-+-+-+-+-+-+-+-+-+
|                       Link Set In #2                          |
:                              :                                :
+-+-+-+-+-+-+-+-+-+-+-+-+-+-+-+-+-+-+-+-+-+-+-+-+-+-+-+-+-+-+-+-+
|                       Link Set Out #2                         :
:                              :                                :
+-+-+-+-+-+-+-+-+-+-+-+-+-+-+-+-+-+-+-+-+-+-+-+-+-+-+-+-+-+-+-+-+
|            Additional Link set pairs as needed                |
:                  to specify connectivity                      :
+-+-+-+-+-+-+-+-+-+-+-+-+-+-+-+-+-+-+-+-+-+-+-+-+-+-+-+-+-+-+-+-+
```

FIG. 7

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Conversion   |                  Reserved                      |
+-+-+-+-+-+-+-+-+-+-+-+-+-+-+-+-+-+-+-+-+-+-+-+-+-+-+-+-+-+-+-+-+
|                        Link Set A #1                           |
+-+-+-+-+-+-+-+-+-+-+-+-+-+-+-+-+-+-+-+-+-+-+-+-+-+-+-+-+-+-+-+-+
|                         WC Set A #1                            |
:                              :                                 :
:                              :                                 :
+-+-+-+-+-+-+-+-+-+-+-+-+-+-+-+-+-+-+-+-+-+-+-+-+-+-+-+-+-+-+-+-+
|      Additional Link set and WC set pairs as needed to         |
:                  specify IngressPoolMatrix                     :
+-+-+-+-+-+-+-+-+-+-+-+-+-+-+-+-+-+-+-+-+-+-+-+-+-+-+-+-+-+-+-+-+
|                         WC Set B #1                            |
+-+-+-+-+-+-+-+-+-+-+-+-+-+-+-+-+-+-+-+-+-+-+-+-+-+-+-+-+-+-+-+-+
|                        link Set B #1                           |
:                              :                                 :
:                              :                                 :
+-+-+-+-+-+-+-+-+-+-+-+-+-+-+-+-+-+-+-+-+-+-+-+-+-+-+-+-+-+-+-+-+
|      Additional WC set and Link set pairs as needed to         |
:                  specify PoolEgressMatrix                      :
+-+-+-+-+-+-+-+-+-+-+-+-+-+-+-+-+-+-+-+-+-+-+-+-+-+-+-+-+-+-+-+-+
```

FIG. 9

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Action     |                   Reserved                    |
+-+-+-+-+-+-+-+-+-+-+-+-+-+-+-+-+-+-+-+-+-+-+-+-+-+-+-+-+-+-+-+-+
|       WC Identifier 1         |       WC Identifier 2         |
+-+-+-+-+-+-+-+-+-+-+-+-+-+-+-+-+-+-+-+-+-+-+-+-+-+-+-+-+-+-+-+-+
:                               :                               :
+-+-+-+-+-+-+-+-+-+-+-+-+-+-+-+-+-+-+-+-+-+-+-+-+-+-+-+-+-+-+-+-+
|       WC Identifier n-1       |       WC Identifier n         |
+-+-+-+-+-+-+-+-+-+-+-+-+-+-+-+-+-+-+-+-+-+-+-+-+-+-+-+-+-+-+-+-+
```

FIG. 10

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Conversion   |                  Reserved                     |
+-+-+-+-+-+-+-+-+-+-+-+-+-+-+-+-+-+-+-+-+-+-+-+-+-+-+-+-+-+-+-+-+
|                           WC Set #1                           |
+-+-+-+-+-+-+-+-+-+-+-+-+-+-+-+-+-+-+-+-+-+-+-+-+-+-+-+-+-+-+-+-+
|                     Input Wavelength Set #1                   |
+-+-+-+-+-+-+-+-+-+-+-+-+-+-+-+-+-+-+-+-+-+-+-+-+-+-+-+-+-+-+-+-+
|                     Output Wavelength Set #1                  |
:                               :                               :
+-+-+-+-+-+-+-+-+-+-+-+-+-+-+-+-+-+-+-+-+-+-+-+-+-+-+-+-+-+-+-+-+
|              Additional Wavelength set pairs as needed        |
:                    to specify conversion                      :
+-+-+-+-+-+-+-+-+-+-+-+-+-+-+-+-+-+-+-+-+-+-+-+-+-+-+-+-+-+-+-+-+
```

FIG. 11

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Im-Type    |  Unit  |   Length     |         Reserved        |
+-+-+-+-+-+-+-+-+-+-+-+-+-+-+-+-+-+-+-+-+-+-+-+-+-+-+-+-+-+-+-+-+
|                      Wavelength information                    |
+-+-+-+-+-+-+-+-+-+-+-+-+-+-+-+-+-+-+-+-+-+-+-+-+-+-+-+-+-+-+-+-+
|                   Max impairment parameter value               :
+-+-+-+-+-+-+-+-+-+-+-+-+-+-+-+-+-+-+-+-+-+-+-+-+-+-+-+-+-+-+-+-+
|                   Min impairment parameter value               :
:                                   :                            :
+-+-+-+-+-+-+-+-+-+-+-+-+-+-+-+-+-+-+-+-+-+-+-+-+-+-+-+-+-+-+-+-+
|              Additional Wavelength impairment parameters       |
:                                   :                            :
+-+-+-+-+-+-+-+-+-+-+-+-+-+-+-+-+-+-+-+-+-+-+-+-+-+-+-+-+-+-+-+-+
```

FIG. 14

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                    Connectivity Matrix Sub-TLV                 |
|    (list of ingress-egress port pairs with common parameters)  |
:                                   :                            :
+-+-+-+-+-+-+-+-+-+-+-+-+-+-+-+-+-+-+-+-+-+-+-+-+-+-+-+-+-+-+-+-+
|                     Port-Port Parameter TLV #1                 |
+-+-+-+-+-+-+-+-+-+-+-+-+-+-+-+-+-+-+-+-+-+-+-+-+-+-+-+-+-+-+-+-+
|                     Port-Port Parameter TLV #2                 |
+-+-+-+-+-+-+-+-+-+-+-+-+-+-+-+-+-+-+-+-+-+-+-+-+-+-+-+-+-+-+-+-+
:                                                                :
+-+-+-+-+-+-+-+-+-+-+-+-+-+-+-+-+-+-+-+-+-+-+-+-+-+-+-+-+-+-+-+-+
|                     Port-Port Parameter TLV #N                 |
+-+-+-+-+-+-+-+-+-+-+-+-+-+-+-+-+-+-+-+-+-+-+-+-+-+-+-+-+-+-+-+-+
```

FIG. 15

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|RestrictionKind|T|   Reserved      |        MaxNumChannels     |
+-+-+-+-+-+-+-+-+-+-+-+-+-+-+-+-+-+-+-+-+-+-+-+-+-+-+-+-+-+-+-+-+
|                    Wavelength Set Per action                   |
|                           (variable)                           |
+-+-+-+-+-+-+-+-+-+-+-+-+-+-+-+-+-+-+-+-+-+-+-+-+-+-+-+-+-+-+-+-+
```

FIG. 16

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Reserved             |       Num Wavelengths       |
+-+-+-+-+-+-+-+-+-+-+-+-+-+-+-+-+-+-+-+-+-+-+-+-+-+-+-+-+-+-+-+-+
|Grid | C.S. |     Reserved       |     n for lowest frequency  |
+-+-+-+-+-+-+-+-+-+-+-+-+-+-+-+-+-+-+-+-+-+-+-+-+-+-+-+-+-+-+-+-+
|        Bit Map Word #1 (Lowest frequency channels)             |
+-+-+-+-+-+-+-+-+-+-+-+-+-+-+-+-+-+-+-+-+-+-+-+-+-+-+-+-+-+-+-+-+
:                                                                :
+-+-+-+-+-+-+-+-+-+-+-+-+-+-+-+-+-+-+-+-+-+-+-+-+-+-+-+-+-+-+-+-+
|  Bit Map Word #N (Highest frequency channels)  |  Padded bits  |
+-+-+-+-+-+-+-+-+-+-+-+-+-+-+-+-+-+-+-+-+-+-+-+-+-+-+-+-+-+-+-+-+
```

FIG. 17

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                       Port Parameter TLV #1                   |
+-+-+-+-+-+-+-+-+-+-+-+-+-+-+-+-+-+-+-+-+-+-+-+-+-+-+-+-+-+-+-+-+
|                       Port Parameter TLV #2                   |
+-+-+-+-+-+-+-+-+-+-+-+-+-+-+-+-+-+-+-+-+-+-+-+-+-+-+-+-+-+-+-+-+
:                                                               :
+-+-+-+-+-+-+-+-+-+-+-+-+-+-+-+-+-+-+-+-+-+-+-+-+-+-+-+-+-+-+-+-+
|                       Port Parameter TLV #N                   |
+-+-+-+-+-+-+-+-+-+-+-+-+-+-+-+-+-+-+-+-+-+-+-+-+-+-+-+-+-+-+-+-+
```

FIG. 18

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Connectivity=2 |                  Reserved                     |
+-+-+-+-+-+-+-+-+-+-+-+-+-+-+-+-+-+-+-+-+-+-+-+-+-+-+-+-+-+-+-+-+
|                       Link Set In #1                          |
:                  (Link ID corresponding to P2)                :
+-+-+-+-+-+-+-+-+-+-+-+-+-+-+-+-+-+-+-+-+-+-+-+-+-+-+-+-+-+-+-+-+
|                       Link Set Out #1                         |
:                  (Link ID corresponding to P6)                :
+-+-+-+-+-+-+-+-+-+-+-+-+-+-+-+-+-+-+-+-+-+-+-+-+-+-+-+-+-+-+-+-+
|                       Link Set In #2                          |
:              (Link ID list corresponding to P1 and P3)        :
+-+-+-+-+-+-+-+-+-+-+-+-+-+-+-+-+-+-+-+-+-+-+-+-+-+-+-+-+-+-+-+-+
|                       Link Set Out #2                         |
:              (Link ID list corresponding to P4 and P5)        :
+-+-+-+-+-+-+-+-+-+-+-+-+-+-+-+-+-+-+-+-+-+-+-+-+-+-+-+-+-+-+-+-+
```

FIG. 19

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                     WC Set (ID of WC1)                        |
+-+-+-+-+-+-+-+-+-+-+-+-+-+-+-+-+-+-+-+-+-+-+-+-+-+-+-+-+-+-+-+-+
|1|0 0 0                  ......                          0 0 0|
+-+-+-+-+-+-+-+-+-+-+-+-+-+-+-+-+-+-+-+-+-+-+-+-+-+-+-+-+-+-+-+-+
```

FIG. 22

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| RestrKind=0   |1| Reserved  |   MaxNumChannels = 4           |
+-+-+-+-+-+-+-+-+-+-+-+-+-+-+-+-+-+-+-+-+-+-+-+-+-+-+-+-+-+-+-+-+
|                    Wavelength Set Per action                  |
|                       (λ1、λ2、λ3、λ4)                         |
+-+-+-+-+-+-+-+-+-+-+-+-+-+-+-+-+-+-+-+-+-+-+-+-+-+-+-+-+-+-+-+-+
```

FIG. 23

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         Reserved              |    Num Wavelengths = 4        |
+-+-+-+-+-+-+-+-+-+-+-+-+-+-+-+-+-+-+-+-+-+-+-+-+-+-+-+-+-+-+-+-+
|                         Label of λ1                           |
+-+-+-+-+-+-+-+-+-+-+-+-+-+-+-+-+-+-+-+-+-+-+-+-+-+-+-+-+-+-+-+-+
|1 0 0 0|0 0 0             ......                         0 0 0|
+-+-+-+-+-+-+-+-+-+-+-+-+-+-+-+-+-+-+-+-+-+-+-+-+-+-+-+-+-+-+-+-+
```

FIG. 24

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| RestrKind=0  |1|  Reserved    |     MaxNumChannels = 4        |
+-+-+-+-+-+-+-+-+-+-+-+-+-+-+-+-+-+-+-+-+-+-+-+-+-+-+-+-+-+-+-+-+
|                    Wavelength Set Per action                   |
|                     (λ1、λ2、λ3、λ4)                            |
+-+-+-+-+-+-+-+-+-+-+-+-+-+-+-+-+-+-+-+-+-+-+-+-+-+-+-+-+-+-+-+-+
```

FIG. 25

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Reserved           |     Num Wavelengths = 4       |
+-+-+-+-+-+-+-+-+-+-+-+-+-+-+-+-+-+-+-+-+-+-+-+-+-+-+-+-+-+-+-+-+
|                         Label of λ1                            |
+-+-+-+-+-+-+-+-+-+-+-+-+-+-+-+-+-+-+-+-+-+-+-+-+-+-+-+-+-+-+-+-+
|0 0 1 1|0 0 0              ......                        0 0 0|
+-+-+-+-+-+-+-+-+-+-+-+-+-+-+-+-+-+-+-+-+-+-+-+-+-+-+-+-+-+-+-+-+
```

FIG. 26

METHOD, APPARATUS AND SYSTEM FOR ADVERTISING ROUTING PROTOCOL MESSAGE AND CALCULATING ROUTE

CROSS-REFERENCE TO RELATED APPLICATIONS

This application is a continuation of International Application No. PCT/CN2010/070638, filed on Feb. 11, 2010, which claims priority to Chinese Patent Application No. 200910006862.4, filed on Feb. 26, 2009, both of which are hereby incorporated by reference in their entireties.

TECHNICAL FIELD

The present invention relates to the field of optical network communications technologies, and in particular, to a method, an apparatus and a system for advertising routing protocol message and calculating a route in a wavelength division multiplexing (WDM) network.

BACKGROUND

With the development of telecommunication networks, an optical network has become a core of the future Wide Area Network (WAN) and Metropolitan Area Network (MAN). A Wavelength Division Multiplexing (WDM) optical network is of widespread concern, and with the emergence of an Optical Wavelength Routing Switch (WRS) and a Photonic Cross-Connector (PXC), data exchange may be implemented in an optical domain in the network.

In the WDM optical network, an optical channel needs to be determined by optical switching nodes, an optical link (optical fiber), and a wavelength (channel) assigned to each optical link. In an all-optical group that does not have a wavelength conversion capability, the optical channel must be established by using a common wavelength of all links along a route, which is a wavelength continuity restriction. During optical channel calculation, routing and wavelength assignment must be considered at the same time. That is because even though the route exists, in which each link of the route has a wavelength resource, if no common wavelength of all the links exists, the optical channel may not be established.

To relax the wavelength continuity restriction, an optical cross-connection device with the wavelength conversion capability may be deployed in the network, so that the optical channel is divided into several sub-connections of different wavelengths to form an optical path. However, due to constraint of factors such as technologies and costs, the device does not have arbitrary port cross-connection and arbitrary wavelength conversion capability, which therefore increases the difficulty of calculating wavelength routing.

With the development of service requirements and optical network technologies, the evolution from an optical transfer network to an intelligent optical network is an inexorable trend of the optical network development. An Automatic Switched Optical Network (ASON) is a new generation optical network integrating switching and transferring, which is a dynamic, automatic switched transfer network and is capable of automatically calculating a path and implementing establishment, restoration, and removal of a connection through signaling control. Therefore, the ASON and the WDM are combined, and the wavelength routing in the WDM optical network may be automatically calculated and established through the ASON, which is a new optical transfer mode.

However, due to the wavelength continuity restriction in the WDM optical network and a cross-connection restriction of the optical cross-connection device, a wavelength division device may not cross-connect an arbitrary wavelength channel to another wavelength channel, which makes it difficult for the ASON to calculate the path in the WDM optical network. In the prior art, the following method is provided to solve the cross-connection restriction problem of a WDM optical network device. Routing and wavelength assignment are performed separately. A route is selected without considering the wavelength resource, and then a signaling is sent along the route for detecting to determine available wavelengths. If it is detected that no wavelength resource along the selected route is available, a signaling crank-back is performed and other routes are reselected for redetection.

The disadvantage of this method is as follows. Channel establishment efficiency is low, so that the time of connection establishment or rerouting is too long, and the method may not take full advantage of network resources to maximize wavelength utilization efficiency.

SUMMARY

The present invention is directed to a method, an apparatus and a system for advertising a routing protocol message and calculating a route, which solve the problems that the time of connection establishment or rerouting in wavelength routing is too long and that wavelength utilization efficiency is low in the prior art.

The following technical solutions are provided in embodiments of the present invention.

An embodiment of the present invention provides a method for advertising a routing protocol message in a WDM network, where the method includes:

obtaining node information and link information of a node, in which the node information contains port cross-connection capability information of the node, and the link information contains wavelength restriction information and wavelength status information of each link connected to the node; and carrying the obtained node information and link information in a Type-Length-Value (TLV) of a routing protocol message, and advertising the routing protocol message in the network.

An embodiment of the present invention provides a method for calculating a route in a WDM network, where the method includes:

obtaining node information and link information of each node from a TLV of a routing protocol message advertised by each node, in which the node information contains port cross-connection capability information of a node, and the link information contains wavelength restriction information and wavelength status information of each link connected to the node; and receiving a request for a service, and calculating a route satisfying a requirement of the service and assigning a wavelength to the service according to the obtained node information and link information.

An embodiment of the present invention provides an apparatus for advertising a routing protocol message in a WDM network, where the apparatus includes:

an information obtaining unit, configured to obtain node information and link information of a node, in which the node information contains port cross-connection capability information of the node, and the link information contains wavelength restriction information and wavelength status information of each link connected to the node; and an information advertising unit, configured to carry the obtained node information and link information in a TLV of the routing protocol message and advertise a routing protocol message in the network.

An embodiment of the present invention also provides an apparatus for calculating a route in a WDM network, where the apparatus includes:

an information obtaining unit, configured to obtain node information and link information of each node from a TLV of a routing protocol message advertised by each node, in which the node information contains port cross-connection capability information of a node, and the link information contains wavelength restriction information and wavelength status information of each link connected to the node;

a service receiving unit, configured to receive a request for a service; and a calculation unit, configured to calculate a route satisfying a requirement of the service and assign a wavelength to the service according to the obtained node information and link information.

An embodiment of the present invention also provides a system for advertising a routing protocol message and calculating a route in a WDM network, where the system includes:

a routing protocol message advertising apparatus, configured to obtain node information and link information of a node, in which the node information contains port cross-connection capability information of the node, and the link information contains wavelength restriction information and wavelength status information of each link connected to the node; and carry the obtained node information and link information in a TLV of the routing protocol message and advertise a routing protocol message in the network; and a route calculation apparatus, configured to obtain node information and link information of each node from the TLV of the routing protocol message advertised by each node; receive a request for a service; and calculate a route satisfying a requirement of the service and assign a wavelength to the service according to the obtained node information and link information.

Through the method, apparatus and system for advertising the routing protocol message and calculating the route provided by the embodiments of the present invention, the node obtains the node information and link information of the node, carries the obtained node information and link information in the TLV object of the routing protocol message, and advertises the routing protocol message, and after receiving the information, the other nodes or centralized path computation elements in the WDM network may, according to the information, accurately and quickly calculate a wave length route having an available wavelength resource for the service and calculate which wavelength is assigned to bear the service on each link, without signaling detection and signaling crank-back, which thereby conserves a large amount of network resources.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons skilled in the art may derive other drawings from the accompanying drawings without creative efforts.

FIG. 6 is a schematic view of a system for advertising a routing protocol message and calculating a route in a WDM network according to an embodiment of the present invention;

FIG. 7 is a structural diagram of Connectivity Matrix sub-TLV;

FIG. 9 is a structural diagram of Accessibility of wavelength converters sub-TLV;

FIG. 10 is a structural diagram of WC Set;

FIG. 11 is a structural diagram of Wavelength conversion range sub-TLV;

FIG. 14 is a structural diagram of Node Impairment sub-TLV;

FIG. 15 is a structural diagram of Port to Port Impairment sub-TLV;

FIG. 16 is a structural diagram of WSON Port Wavelength Restrictions sub-TLV;

FIG. 17 is a structural diagram of Wavelength Status Information sub-TLV;

FIG. 18 is a structural diagram of Per Port Impairment sub-TLV;

FIG. 19 is a structural diagram of Connectivity Matrix sub-TLV of Node B;

FIG. 22 is a structural diagram of WC Usage state Sub-TLV of the WC in Node B;

FIG. 23 is a structural diagram of WSON Port Wavelength Restrictions sub-TLV of Node B;

FIG. 24 is a structural diagram of Wavelength Status Information sub-TLV of Link L2;

FIG. 25 is a structural diagram of WSON Port Wavelength Restrictions sub-TLV of Link L6;

FIG. 26 is a structural diagram of Wavelength Status Information sub-TLV of Link L6.

DETAILED DESCRIPTION

A method, an apparatus and a system for advertising a routing protocol message and calculating a route in a WDM network according to embodiments of the present invention are described in details in the following with reference to accompanying drawings.

Apparently, the embodiments described in the following are for the exemplary purpose, without covering all embodiments of the present invention. All other embodiments obtained by persons skilled in the art based on the embodiments of the present invention without creative efforts shall fall within the protection scope of the present invention.

Figure 1:
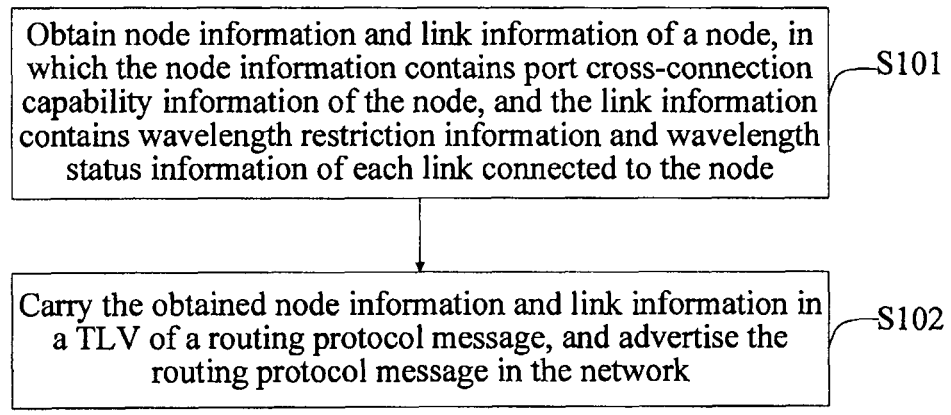
FIG. 1 is a flow chart of a method for advertising a routing protocol message in a WDM network according to an embodiment of the present invention.

As shown in FIG. 1, a method for advertising a routing protocol message in a WDM network according to an embodiment of the present invention is illustrated. The method includes the following steps.

S101, obtain node information and link information of a node, in which the node information contains port cross-connection capability information of the node, and the link information contains wavelength restriction information and wavelength status information of each link connected to the node.

The node information of the node may also include at least one of the following: wavelength conversion capability information of the node, impairment information at node level, and port to port impairment information inside the node.

The wavelength conversion capability information of the node includes: whether a wavelength converter (WC) in the node is connected to an ingress port and an egress port of the node; a range of wavelengths that may be converted by the WC; and whether the WC is available or occupied.

The link information of the node may also include link impairment information on each port of the node.

S102, carry the obtained node information and link information in a TLV of a routing protocol message, and advertise the routing protocol message in the network.

The specific advertising method may be as follows: In the routing protocol message advertised by the node, for example, a sub-TLV object in a TLV object for describing a node attribute may carry cross-connection capability information of the node, or may also carry the wavelength conversion capability information of the node, or the impairment information at node level, or the port to port impairment information inside the node.

Furthermore, for the link information of the node, for example, a sub-TLV object in a TLV object describing the node attribute may carry the wavelength restriction information and wavelength status information of each link connected to the node, or may also carry the link impairment information on each port of the node.

By using the method for advertising the routing protocol message in the WDM network according to the embodiment of the present invention, the node obtains the node information containing the port cross-connection capability information of the node and the link information containing the wavelength restriction information and wavelength status information of each link connected to the node, and carries the obtained information in the TLV object of the routing protocol message to advertise, so as to provide other nodes or centralized path computation elements with the information for route calculation. The other nodes or centralized path computation elements may, according to the information, accurately and quickly calculate a wavelength route having an available wavelength resource for a service and calculate which wavelength is assigned to bear the service on each link, without signaling detection and signaling crank-back, which thereby conserves a large amount of network resources.

Figure 2:
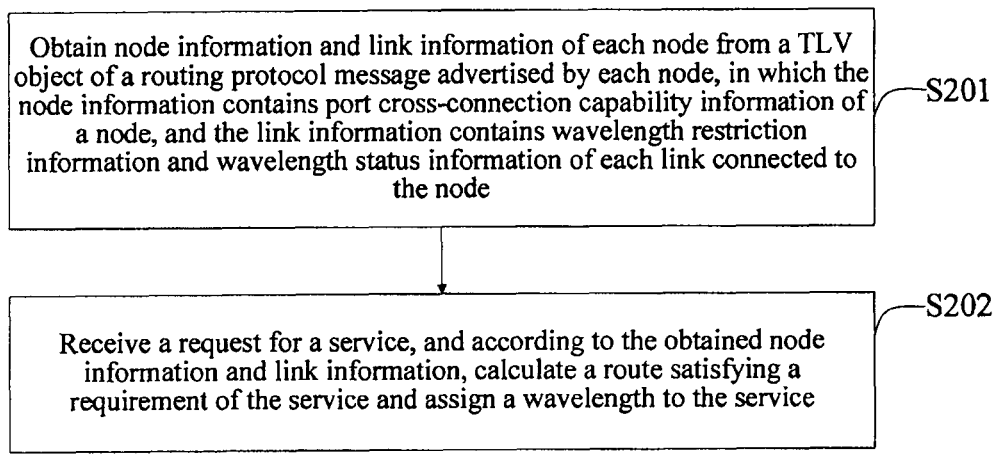
FIG. 2 is a flow chart of a method for calculating a route in a WDM network according to an embodiment of the present invention.

As shown in FIG. 2, a method for calculating a route in a WDM network according to an embodiment of the present invention may include the following steps.

S201, obtain node information and link information of each node from a TLV object of a routing protocol message advertised by each node, in which the node information contains port cross-connection capability information of a node, and the link information contains wavelength restriction information and wavelength status information of each link connected to the node.

S202, receive a request for a service, and according to the obtained node information and link information, calculate a route satisfying a requirement of the service and assign a wavelength to the service.

Through the method for calculating the route in the WDM network according to the embodiment of the present invention, a node or a centralized path computation element obtains the node information and the link information carried in the TLV object of the routing protocol message and advertised by other nodes, in which the node information contains the cross-connection capability information of the node, and the link information contains the wavelength restriction information and wavelength status information of each link connected to the node, and the node or the centralized path computation element may, according to the information, calculate the route satisfying the requirement for a request for the service and assign the wavelength to the service, so that the time for establishing the connection or rerouting may be reduced, and the method may take full advantage of network resources to increase wavelength utilization efficiency.

How to carry the node information and the link information of the node in the WDM network is described in details in the following in different manners. An Open Shortest Path First (OSPF) protocol may be adopted to announce a link attribute in the network. The routing protocol is a type of Interior Gateway Protocols (IGPs). The routing protocol message sent by the node may contain one or more TLV objects describing the link information, in which each TLV object contains link information of one link.

In the prior art, the OSPF protocol is extended. A Node Attribute TLV object in the routing protocol message describes information related to the node.

Manner 1

In Manner 1, the routing protocol message carries the port cross-connection capability information of the node.

An optical cross-connection device generally has asymmetrical characteristic and port cross-connection restriction. That is, ports in one optical cross-connection device may not cross-connect arbitrarily, and a certain ingress port set may be only cross-connected to a certain egress port set rather than an arbitrary egress port. Therefore, a common method for advertising the port cross-connection capability information of the node is as follows. A Link TLV object corresponding to each link is only used for describing port cross-connection capability corresponding to the link. Port cross-connection capability information corresponding to the link is carried in the Link TLV object of the link, and then advertised in the network. Generally, because a plurality of ports inside the node has the same cross-connection capability, a great amount of redundant information is advertised in the network by using the method, which therefore causes network resource occupation.

In the present invention, a Connectivity Matrix sub-TLV (a Connectivity Matrix sub-TLV object) in a Node Attribute TLV may describe the port cross-connection capability information of the node. For example, a format described in FIG. 7 may be adopted for a description. A head of the sub-TLV is not described in FIG. 7. The head of the sub-TLV object is used for indicating a type of the sub-TLV object. For example, the type of the sub-TLV described in FIG. 7 is the Connectivity Matrix sub-TLV object. The head of the sub-TLV object is also used for indicating the length of the sub-TLV object.

Here, the "connectivity" field indicates whether the node is a fixed switching device or a cross-connectable switching device. For example, if connectivity=1, it indicates that each port is connected fixedly; and if connectivity=2, it indicates that each port has cross-connection capability. The "Reserved" represents a reserved field, which is the same in the following tables.

Figure 8:
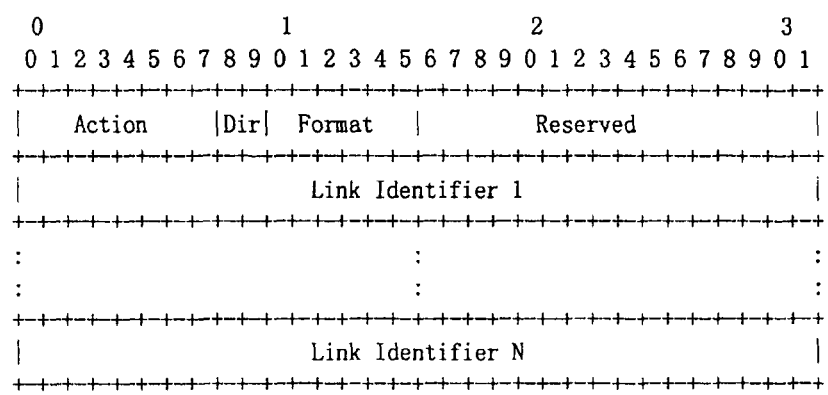
FIG. 8 is a structural diagram of Link Set In/Out.

The "Link Set In #i" field and the "Link Set Out #i" field indicate that a link set contained in "Link Set In #i" may be cross-connected to a link set contained in "Link Set Out #i". "Link Set In" and "Link Set Out" have the same format and are used for describing one link set. For example, a format of "Link Set In" or "Link Set Out" may be described in FIG. 8.

Here, the "Action" field indicates the mode for describing the link set in a link set object. For example, if Action=1, it indicates "Inclusive List" and if Action=2, it indicates "Inclusive Range".

The "Dir" field indicates a direction of each link. For example, if Dir=1, it indicates a two-way direction; if Dir=2, it indicates an incoming direction; and if Dir=3, it indicates an outgoing direction.

"Format" indicates a method for identifying a link. For example, if Format=1, it indicates that the link is identified by adopting a local identifier (ID) of the link.

The "Link Identifier i" (i=1-N) field indicates a connection ID.

The "Additional Link set pairs as needed to specify connectivity" field in the last row of FIG. 7 is used for describing connectivity of ports in other link set pairs.

Manner 2

In Manner 2, the routing protocol message carries the wavelength conversion capability of the node.

To describe the wavelength conversion capability information of the node, a sub-TLV in the Node Attribute TLV may indicate information such as accessibility of the WC, a conversion range of the WC, and status of the WC. For example, three sub-TLVs may be used for describing the information respectively. The details are described in the following.

(1) Accessibility information of the WC, that is, whether an ingress port and an egress port of the WC are able to be connected to the WC.

An Accessibility of wavelength converters sub-TLV (an Accessibility of wavelength converters sub-TLV object) in the Node Attribute TLV may describe the accessibility information of the WC in the node. For example, a format described in FIG. 9 may be adopted for a description. In FIG. 9, a head of the sub-TLV is not described.

Here, "conversion" indicates wavelength conversion capability of the node. If conversion=0, it indicates fixed conversion capability; if conversion=1, it indicates that conversion capability is shared in the whole node; and if conversion=2, it indicates that the conversion capability is shared among one or more links.

The "Link Set A #i" field and the "WC Set A #i" field compose a set pair, which indicates each link in a link set "Link Set A #i" of the ingress port may be cross-connected to any WC in a WC set "WC Set A #i"; the "Link Set B #i" field and the "WC Set B #i" field compose a set pair, which indicates any WC in a WC set "WC Set B #i" may be cross-connected to each link in a link set "Link Set B #i" of the egress port.

The "Additional Link set and WC set pairs as needed to specify IngressPoolMatrix" field indicates other access link set/WC set pairs for describing a matrix of connections from access links to the WCs; and the "Additional WC set and Link set pairs as needed to specify PoolEgressMatrix" field indicates other WC set/output link set pairs for describing a matrix of connections from the WCs to output links.

"Link Set" may adopt the format of "Link Set" in Manner 1. "WC Set" may adopt a format described in FIG. 10.

In FIG. 10, the "Action" field indicates the mode for describing the WC set in a WC set object. For example, if Action=1, it indicates "Inclusive List"; and if Action=2, it indicates "Inclusive Range". The "WC Identifier i" (i=1-N) field lists a relevant WC identifier. For example, WC Identifier 1 indicates a WC identifier 1, and WC Identifier n indicates a WC identifier n.

(2) Conversion range information of the WC, that is, an input wavelength range and an output wavelength range of each WC.

A Wavelength conversion range sub-TLV (a Wavelength conversion range sub-TLV object) in the Node Attribute TLV may describe the conversion range information of the WC in the node. For example, a format described in FIG. 11 may be adopted for a description. In FIG. 11, a head of the sub-TLV is not described.

In FIG. 11, "conversion" indicates conversion capability of the WC of the node. If conversion=0, it indicates fixed conversion capability; if conversion=1, it indicates that conversion capability is shared in the whole node; and if conversion=2, it indicates that the conversion capability is shared among one or more links.

"WC Set #i" indicates each WC in the WC set; "Input Wavelength Set #i" indicates the input wavelength range is the wavelengths designated in "Input Wavelength Set", and "Output Wavelength Set #i" indicates the output wavelength range is the wavelengths designated in "Output Wavelength Set".

"Additional Wavelength set pairs as needed to specify conversion" indicates other WC set/input/output wavelength set pairs for describing the conversion capability of the WC.

Figure 12:
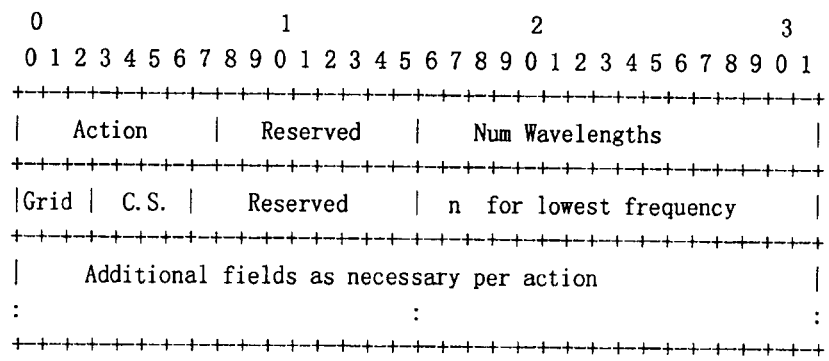
FIG. 12 is a structural diagram of Input Wavelength Set and Output Wavelength Set.

"Input Wavelength Set" and "Output Wavelength Set" may adopt a format described in FIG. 12.

Here, "Action" indicates the mode for describing a wavelength set in the wavelength set. For example, if Action=0, it indicates "Inclusive List"; if Action=1, it indicates "Exclusive List"; if Action=2, it indicates "Inclusive Range"; if Action=3, it indicates "Exclusive Range"; and if Action=4, it indicates "represented in Bitmap Set".

"Num Wavelengths" indicates the number of wavelengths in the wavelength set (Action=0-3), or the number of wavelengths in the bit map (Action=4).

The fifth to eighth bytes (in the second row) are a wavelength label, indicating a wavelength of the lowest frequency in the link.

Here, the "Grid" field indicates a wavelength division type, and if Grid=1, it indicates G.694.1 Dense Wavelength Division Multiplexing (DWDM). The "C.S." field indicates a frequency interval, that is, a frequency difference between two adjacent wavelengths, and the unit is THz. The "n for lowest frequency" indicates the number of the lowest frequencies, in which n is a signed integer. The frequency of the wavelength indicated by the wavelength label is f=mid-frequency (193.1 THz)+n*frequency interval.

"Additional fields as necessary per action" indicates that a specific format of "Additional fields" is different for different descriptions. For example, when Action=0, n values of wavelengths are listed in an order from the lowest frequency to the highest frequency (the n value of wavelengths of the lowest frequency is described in the seventh and eighth fields and not described again); when Action=1, n values of the wavelengths not contained are listed in the order from the lowest frequency to the highest frequency; when Action=2, wavelengths contained in the wavelength set (n value of the wavelengths may be n, n+1, n+2, ..., n+Num Wavelengths−1) may be determined by "Num Wavelengths" and n, so "Additional fields" is not required; when Action=3, wavelengths contained in the wavelength set (except wavelengths whose n value may be n, n+1, n+2, ..., n+Num Wavelengths−1) may be determined by "Num Wavelengths" and n, so "Additional fields" is not required; when Action=4, "Additional fields" adopts the bit map to indicate whether each wavelength is contained in the set, that is, "Additional fields" uses each bit to indicate whether each wavelength is contained in the set (in the order from the lowest frequency to the highest frequency). For example, a bit "1" indicates that the wavelength is contained, and a bit "0" indicates that the wavelength is not contained.

(3) Status information of the WC, that is, whether each WC is available or occupied.

Figure 13:
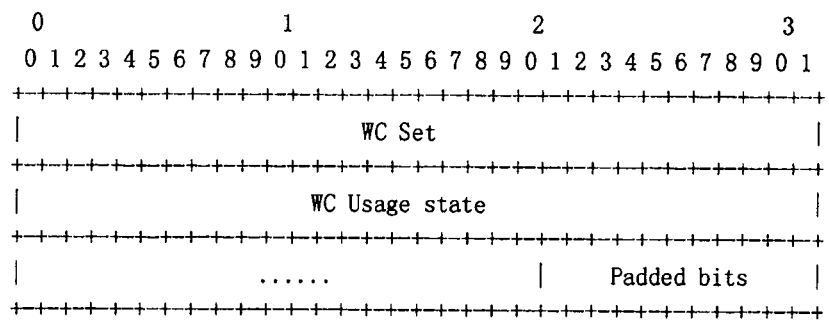
FIG. 13 is a structural diagram of WC Usage state sub-TLV.

A WC Usage state sub-TLV (a WC Usage state sub-TLV object) in the Node Attribute TLV may describe the status information of the WC in the node. For example, a format described in FIG. 13 may be adopted for a description. In FIG. 13, a head of the sub-TLV is not described.

Here, each WC is listed in "WC Set", and "WC Usage state" indicates the status of each WC in the bit map. For example, the bit "1" indicates that the corresponding WC is available, and the bit "0" indicates that the WC is occupied.

The "Padded bits" field represents padded bits.

Manner 3

In Manner 3, the routing protocol message carries the impairment information at node level.

A Node Impairment sub-TLV (a Node Impairment sub-TLV object) in the Node Attribute TLV describes the impairment information at node level. For example, a format described in FIG. 14 may be adopted for a description. In FIG. 14, a head of the sub-TLV is not described.

Here, "Im-Type" indicates an impairment type, including a channel frequency range, channel insertion loss, and channel chromatic dispersion. "Unit" indicates a unit of each parameter. For example, the unit of the channel frequency range is GHz. "Length" indicates the length of the impaired parameter. "Wavelength information" indicates a wavelength or wavelength set involved in the impairment information. "Max impairment parameter value" indicates an upper limit of the impairment information. "Min impairment parameter value" indicates a lower limit of the impairment information.

The "Additional Wavelength impairment parameters" field indicates other impairment parameter values.

Manner 4

In Manner 4, the routing protocol message carries the port to port impairment information inside a node.

A Port to Port Impairment, sub-TLV (a Port to Port Impairment sub-TLV object) in the Node Attribute TLV describes the port to port impairment information inside the node, or the Connectivity Matrix Sub-TLV is directly extended to describe relevant information. For example, a format described in FIG. 15 may be adopted for a description. In FIG. 15, a head of the sub-TLV is not described.

Here, "Port-Port Parameter TLV#i" (i=1−N) in the Connectivity Matrix sub-TLV (the Connectivity Matrix sub-TLV object), that is, a port to port parameter TLV object, indicates impairment information of the $i^{th}$ cross-connectable port pair in the Connectivity Matrix sub-TLV, such as insertion loss, an optical signal-to-noise ratio (OSNR), and a channel gain.

"Connectivity Matrix Sub-TLV (list of ingress-egress port pairs with common parameters)" indicates a list of common parameters of ingress-egress port pairs in the Connectivity Matrix Sub-TLV object.

Through Manners 1-4, the node information may be carried in the routing protocol message to be advertised in the WDM network.

In the embodiment of Manners 1-4, the node information is carried in sub-TLVs in the Node Attribute TLV object. In practice, the node information may be also carried in sub-TLV objects in the Link TLV (the Link TLV object). Specifically, the node selects one or more links from the links connected to the node, and the node information is carried in sub-TLV objects in the Link TLV object corresponding to the selected one or more links. Formats of the sub-TLVs are similar to those of the sub-TLV objects in Manners 1-4. After receiving the routing protocol message, other nodes may obtain the corresponding node information according to the sub-TLVs.

Manner 5

In Manner 5, the routing protocol message carries the wavelength restriction information and wavelength status information of the link.

(1) Wavelength Restriction Information of the Link

A Port Wavelength Restrictions sub-TLV (a Port Wavelength Restrictions sub-TLV object) of a Wavelength Switched Optical Network (WSON) in the Link TLV describes the wavelength restriction information of a link. For example, a format described in FIG. 16 may be adopted for a description. In FIG. 16, a head of the sub-TLV is not described.

Here, the "RestrictionKind" field indicates whether the link has wavelength restriction or waveband restriction.

For example, if RestrictionKind=0, it indicates that the link has the wavelength restriction, and in this case, the "MaxNumChannels" field indicates the maximum number of wavelengths supported by the link; the "Wavelength Set Per Action" field lists each wavelength supported by the link. If RestrictionKind=1, it indicates that the link has a waveband restriction, and in this case, the "MaxNumChannels" field indicates the maximum width of a waveband; the "Wavelength Set Per Action" field indicates a tuning range.

The "T" field indicates whether the port has cross-connection capability. If T=0, it indicates that the port is connected fixedly. If T=1, it indicates that the port may be cross-connected.

(2) Wavelength Status Information of the Link

A Wavelength Status Information sub-TLV (a Wavelength Status Information sub-TLV object) in the Link TLV may describe the wavelength status information of a link, indicating available wavelengths. For example, a format described in FIG. 17 may be adopted for a description. In FIG. 17, a head of the sub-TLV is not described.

Here, the "Num Wavelengths" field indicates the number of wavelengths in "Bit Map", that is, the number of valid bits in the bit map. The fifth to eighth bytes (in the second row) indicates wavelengths that have the lowest frequency in the link. Here, the "Grid" field indicates a wavelength division type, and if Grid=1, it indicates G.694.1 DWDM. The "C.S" field indicates a frequency interval, that is, a frequency difference between two adjacent wavelengths, and the unit is THz. The "n for lowest frequency" indicates the number of the lowest frequencies, in which n is a signed integer. The frequency of the wavelength indicated by the wavelength label is f=mid-frequency (193.1 THz)+n*frequency interval.

The "Bit Map Word #i" (i=1−N) field indicates status of each wavelength in the link in the order from the lowest frequency to the highest frequency. For example, if a bit corresponding to a wavelength is "1", it indicates that the wavelength is not occupied, that is, the wavelength is available.

The "Padded bits" field represents padded bits.

Manner 6

In Manner 6, the routing protocol message carries the impairment information on each port of a node.

A Per Port Impairment sub-TLV (a Per Port Impairment sub-TLV object) in the Link TLV describes the impairment information on each port of the node. For example, a format described in FIG. 18 may be adopted for a description. In FIG. 18, a head of the sub-TLV is not described.

Here, the "Port Parameter TLV #I" (i=1−N), that is, a port parameter TLV object, is used for describing various impairment information of the link, such as a total input/output optical power range and a channel input/output optical power range.

Through Manners 5 and 6, the link information may be carried in the routing protocol message to be advertised through the routing protocol.

How the node (the centralized path computation element) in the WDM network receives other node information and link information is described in the following.

After receiving the OSPF routing protocol message sent by other nodes, the node (or the centralized path computation element) calculates the route for a request for a service and assigns an appropriate wavelength for the service according to the following steps.

First, sub-TLVs such as the Connectivity Matrix sub-TLV, the common wavelength conversion information sub-TLV, the Node Impairment sub-TLV, and the Port to Port Impairment sub-TLV are extracted from the Node Attribute TLV to obtain information of other nodes, such as the cross-connection capability information, the wavelength conversion capability of the node, the impairment information at node level, and the port to port impairment information inside the node.

Then, sub-TLVs such as the WSON Port Wavelength Restrictions sub-TLV, the Wavelength Usage state sub-TLV, or the Per Port Impairment sub-TLV are extracted from the Link TLV to obtain wavelength restriction information and wavelength status information of a link that is connected to other nodes and link impairment information on each port of other nodes.

After obtaining the foregoing information, the node (or the centralized path computation element) saves the information locally. When a wavelength routing request arrives, the information may be used for calculation.

A wavelength routing solution according to an embodiment of the present invention is described in an application embodiment in the following.

Figure 3:
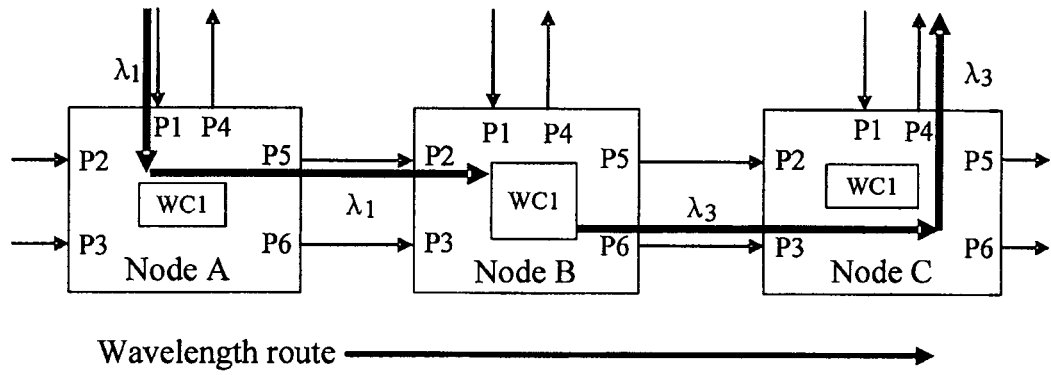
FIG. 3 is a schematic view of a method for advertising a routing protocol message and calculating a route according to an application embodiment of the present invention.

As shown in FIG. 3, the following three nodes exist in a WDM network: Node A, Node B, and Node C. Each node has six ports, whose local identifiers are P1-P6 respectively, in which P1-P3 are ingress ports, P4-P6 are egress ports, and P1 and P4 are used for adding a service and dropping a service respectively. Each node has a WC, whose local identifier is WC1. It is assumed that each link in FIG. 3 contains the following four wavelengths: λ1, λ2, λ3 and λ4.

In this embodiment, only port cross-connection capability information, wavelength conversion capability information, and wavelength accessibility information of a link are taken as examples to describe how relevant information of a node is advertised, received, and utilized. Processes for advertising and receiving other node information and link information are similar to those described in this embodiment, and are not described here again.

Node B is taken as an example, and it is assumed that port cross-connection capability information of Node B is: P2 may be cross-connected to P6, and P1 and P3 may be cross-connected to P4 and P5.

Wavelength conversion capability information of Node B is as follows.

Accessibility information of the WC is: P1, P2, and P3 may be cross-connected to the WC1, and the WC1 may be also cross-connected to P4, P5, and P6.

Wavelength conversion range of the WC is: an input wavelength range is λ1 and λ2, and an output wavelength range is λ3 and λ4.

Status of the WC is an available state.

Wavelength accessibility information of each link connected to Node B is as follows.

Wavelength restriction of Link L2 corresponding to P2 is that λ1-λ4 are supported. Occupation status of each wavelength in the link is that only λ1 is idle.

Wavelength restriction of Link L6 corresponding to P6 is that λ1-λ4 are supported. Occupation status of each wavelength in the link is that only λ1 and λ2 are occupied and λ3 and λ4 are idle.

For the sake of simplicity, wavelength accessibility information of other links connected to Node B is omitted.

After determining the foregoing information, Node B advertises the information through an OSPF protocol. For example, formats defined in the Manners 1-6 are adopted, so as to add the port cross-connection capability information (carried in a Connectivity Matrix sub-TLV) and the wavelength conversion capability information of the node (containing the accessibility information of the WC (carried in a Accessibility of wavelength converters sub-TLV), the conversion range information of the WC (carried in a Wavelength conversion range sub-TLV), and the status information of the WC (carried in a WC Usage state sub-TLV)) in a Node Attribute TLV of the OSPF, and add the wavelength restriction information of the link (carried in a WSON Port Wavelength Restrictions sub-TLV) and the wavelength status information (carried in a Wavelength Status Information sub-TLV) in a Link TLV of the OSPF (in a TLV corresponding to each link). A possible carrying mode is described in the following.

1. The port cross-connection capability information is carried in the Connectivity Matrix sub-TLV, as described in FIG. 19.

Figure 20:
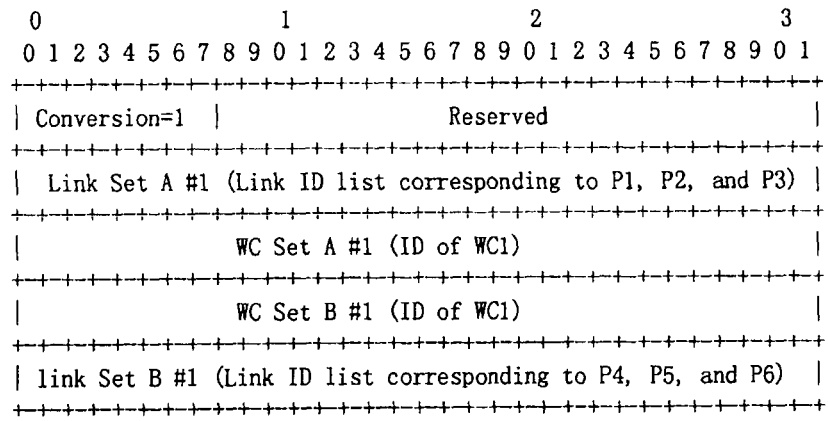
FIG. 20 is a structural diagram of Accessibility of wavelength converters sub-TLV of WC1.

2. The accessibility information of WC1 is carried in the Accessibility of wavelength converters sub-TLV, as described in FIG. 20.

Figure 21:
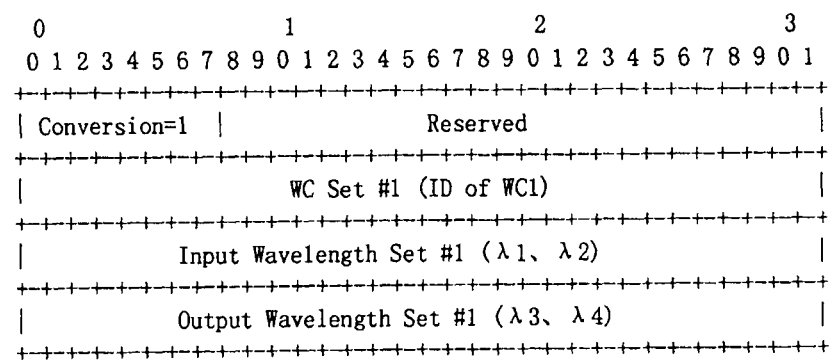
FIG. 21 is a structural diagram of Wavelength conversion range sub-TLV of WC1.

3. The wavelength conversion range information of WC1 is carried in the Wavelength conversion range sub-TLV, as described in FIG. 21.

4. The status information of WC1 is carried in the WC Usage state Sub-TLV, as described in FIG. 22.

Only one WC exists in "WC Set", so only the first bit in a WC Usage state bit map is valid. If the first bit is "1", it indicates that the WC is idle. All other invalid bits are padded with "0".

5. The wavelength restriction information of Link L2 is carried in the WSON Port Wavelength Restrictions sub-TLV, as described in FIG. 23.

6. The wavelength status information of Link L2 is carried in the Wavelength Status Information sub-TLV, as described in FIG. 24.

Only four wavelengths exist in L2, so only the first 4 bits in a wavelength status bit map are valid, in which if the $n^{th}$ bit is "1", it indicates that λn is available. All other invalid bits are padded with "0". If the first bit in the wavelength status bit map (the third row in FIG. 24) is "1", it indicates that λ1 is idle, that is, available.

7. The wavelength restriction information of Link L6 is carried in the WSON Port Wavelength Restrictions sub-TLV, as described in FIG. 25.

8. The wavelength status information of Link L6 is carried in the Wavelength Status Information sub-TLV, as described in FIG. 26.

Information advertising processes for other links are similar to the foregoing description and are not described again.

Other nodes also adopt a similar method to advertise the information of their own. Therefore, each node in the network may learn information of other nodes and links, so the information may be used for wavelength routing calculation.

If Node A receives a request for a service and needs to calculate a wavelength path between the port P1 of Node A and the port P4 of Node C, the routing calculation may be performed according to the foregoing information.

A route may be first determined, and then it is calculated whether an available wavelength resource exists on the route. For example, Node A first calculates a path A-B-C, and then calculates whether the available wavelength resource exists according to collected information of Node A, Node B, and Node C and information of links among Node A, Node B, and Node C.

Node A analyzes a wavelength resource situation of each segment from Node A to Node C. A segment from the port P2 of Node B to the port P6 of Node B is taken as an example for a description.

(1) Port cross-connection capability: Node B supports cross-connection from P2 to P6;

(2) Wavelength availability of the link: Only λ1 is available to the port P2, and only λ3 and λ4 are available to the port P6;

(3) Wavelength conversion capability: Node B has one idle WC, so the λ1 or λ2 may be converted into λ3 or λ4.

It may be seen that, two optional wavelength resources exist in this segment: from the port P2 of Node B (λ1), to the WC1 of Node B, and to the port P6 of Node B (λ3); and from the port P2 of Node B (λ1), to the WC1 of Node B, and to the port P6 of Node B (λ4).

Similarly, Node A also calculates wavelength resource situation of other segments. Finally, an obtained wavelength route may be from the port P1 of Node A (λ1), to the port P5 of Node A (λ1), to the port P2 of Node B (λ1), to the WC1 of Node B (from λ1 to λ3), to the port P6 of Node B (λ3), to the port P3 of Node C (λ3), and to the port P4 of Node C (λ3), as shown in a bold line in FIG. 3.

In a WDM optical network, each node may obtain from a routing protocol message the cross-connection capability information, the wavelength conversion capability information, the impairment information at node level, the port to port impairment information inside the node, and the wavelength restriction information and the wavelength status information of each link, and the link impairment information on each port of other nodes, so that the node may, according to the information, accurately and quickly calculate a wavelength route having an available wavelength resource for a service and calculate which wavelength is assigned to bear the service on each link, without signaling detection and signaling crankback, which thereby conserves a large amount of network resources.

Figure 4:
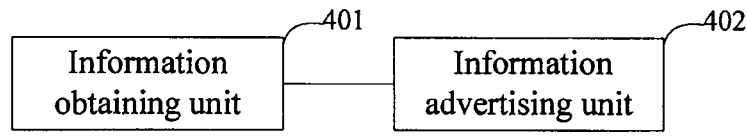
FIG. 4 is a schematic view of an apparatus for advertising a routing protocol message in a WDM network according to an embodiment of the present invention.

As shown in FIG. 4, an apparatus for advertising a routing protocol message in a WDM network according to an embodiment of the present invention is illustrated. The apparatus includes an information obtaining unit 401 and an information advertising unit 402.

The information obtaining unit 401 is configured to obtain node information and link information of a node, in which the node information contains port cross-connection capability information of the node, and the link information contains wavelength restriction information and wavelength status information of each link connected to the node.

The information advertising unit 402 is configured to carry the obtained node information and link information in a TLV object of the routing protocol message and advertise a routing protocol message in the network.

The apparatus for advertising the routing protocol message may be disposed on a node.

Figure 5:
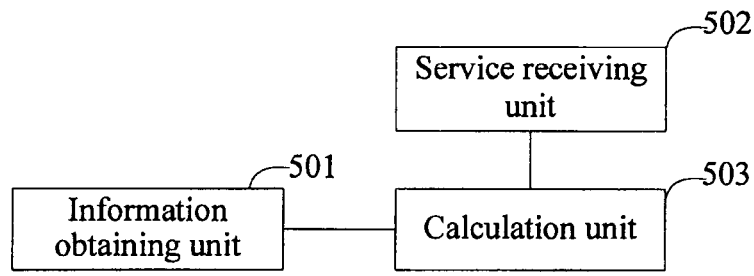
FIG. 5 is a schematic view of an apparatus for calculating a route in a WDM network according to an embodiment of the present invention.

As shown in FIG. 5, an apparatus for calculating a route in a WDM network according to an embodiment of the present invention includes an information obtaining unit 501, a service receiving unit 502, and a calculation unit 503.

The information obtaining unit 501 is configured to obtain node information and link information of each node from a TLV object of a routing protocol message advertised by each node, in which the node information contains port cross-connection capability information of a node, and the link information contains wavelength restriction information and wavelength status information of each link connected to the node.

The service receiving unit 502 is configured to receive a request for a service.

The calculation unit 503 is configured to calculate a route satisfying a requirement of the service and assign a wavelength to the service according to the obtained node information and link information.

The apparatus for calculating the route may be disposed on a node or a centralized path computation element.

As shown in FIG. 6, a system for advertising a routing protocol message and calculating a route in a WDM network according to an embodiment of the present invention is illustrated. The system includes a routing protocol message advertising apparatus 601 and a route calculation apparatus 602.

The routing protocol message advertising apparatus 601 is configured to obtain node information and link information of a node, in which the node information contains port cross-connection capability information of the node, and the link information contains wavelength restriction information and wavelength status information of each link connected to the node; and carry the obtained node information and link information in a TLV object of the routing protocol message and advertise a routing protocol message in the network.

The route calculation apparatus 602 is configured to obtain node information and link information of each node from the TLV object of the routing protocol message advertised by each node; receive a request for a service; and according to the obtained node information and link information, calculate a route satisfying a requirement of the service and assign a wavelength to the service.

The routing protocol message advertising apparatus 601 may be disposed on a node, and the route calculation apparatus 602 may be disposed on a node or a centralized path computation element.

The wavelength routing apparatus and system provided by the embodiments of the present invention may implement wavelength routing in the WDM network with reference to the manners described in the embodiments of the wavelength routing method. For example, the routing protocol message advertising apparatus 601 can be disposed on the Node A, the Node B, and the Node C of the application embodiment, and the route calculation apparatus 602 can be disposed on the Node A of the application embodiment, so that the route calculation apparatus 602 on the Node A can calculate the route and assign the wavelength according to node information and link information advertised by the Node A, the Node B, and the Node C.

Through the wavelength routing apparatus and system provided by the embodiments of the present invention, the node obtains node information and link information of the node, in which the node information contains cross-connection capability information of the node, and the link information contains the wavelength restriction information and wavelength status information of each link connected to the node; and carry the obtained node information and link information in the TLV of the routing protocol message and advertise the routing protocol message, and after receiving the information, the other nodes or centralized path computation elements can accurately and quickly calculate a wavelength route having an available wavelength resource for the service and calculate which wavelength is assigned to bear the service on each link according to the information, without signaling detection and signaling crank-back, which thereby conserves a large amount of network resources.

As contents such as information interactions and performing processes among all modules in the apparatus and system and the method in the embodiments of the present invention are based on the same conception, specific contents may be obtained with reference to the illustration of the method in the embodiments of the present invention, and are not repeated here.

Those skilled in the art should understand that, all or a part of the processes in the method according to the embodiments may be accomplished by relevant hardware under instructions of a computer program. The program may be stored in a computer-readable storage medium. When the program is executed, the flow of the method according to the embodiments of the present invention is performed. The storage medium may be a magnetic disk, an optical disk, a read-only memory (ROM), or an arbitrary access memory (RAM).

In conclusion, the above are merely exemplary embodiments of the present invention. However, the protection scope of the present invention is not limited thereto. Changes or replacements readily apparent to persons skilled in the prior art within the technical scope of the present invention should fall within the scope of the present invention. Therefore, the protection scope of the present invention shall be defined by the claims.

What is claimed is:

1. A method for advertising a routing protocol message in a wavelength division multiplexing network, the method comprising:
    obtaining node information and link information of a node, wherein the node information contains port cross-connection capability information of the node, and the link information contains wavelength restriction information and wavelength status information of each link connected to the node; wherein obtaining the node information of the node further comprises obtaining at least one of the following: wavelength conversion capability information of the node, impairment information at node level, or port to port impairment information inside the node;
    carrying the obtained node information and link information in a Type-Length-Value (TLV) of a routing protocol message, and advertising the routing protocol message in the network;
    wherein obtaining the link information of the node further comprises obtaining link impairment information on each port of the node; and
    wherein the wavelength conversion capability information of the node comprises: whether a wavelength converter in the node is connected to an ingress port and an egress port of the node, a range of wavelengths is converted by the wavelength converter, and whether the wavelength converter is available or occupied.

2. The method according to claim 1, wherein carrying the obtained node information and link information in the TLV of the routing protocol message comprises:
    in the routing protocol message, carrying the port cross-connection capability information of the node in a TLV for describing a node attribute, and carrying the wavelength restriction information and wavelength status information of each link connected to the node in a TLV for describing a link attribute.

3. The method according to claim 2, wherein carrying the obtained node information and link information in the TLV of the routing protocol message further comprises:
    in the routing protocol message, carrying the wavelength conversion capability information of the node, the impairment information at node level, and the port to port impairment information inside the node in a TLV for describing a node attribute, and carrying the link impairment information on each port of the node in a TLV for describing a link attribute.

4. The method according to claim 1, wherein carrying the obtained node information and link information in the TLV of the routing protocol message comprises:
    in the routing protocol message, carrying the port cross-connection capability information of the node and the wavelength restriction information and wavelength status information of each link connected to the node in a TLV for describing a link attribute.

5. A method for calculating a route in a wavelength division multiplexing network, the method comprising:
    obtaining node information and link information of each node from a Type-Length-Value (TLV) of a routing protocol message advertised by each node, wherein the node information contains port cross-connection capability information of a node, and the link information contains wavelength restriction information and wavelength status information of each link connected to the node; wherein the obtained node information of each node further comprises at least one of the following: wavelength conversion capability information of the node, impairment information at node level, or port to port impairment information inside the node;
    receiving a request for a service, and calculating a route satisfying a requirement of the service and assigning a wavelength to the service according to the obtained node information and link information;
    wherein the obtained link information of each node further contains link impairment information on each port of the node; and
    wherein the wavelength conversion capability information of each node comprises: whether a wavelength converter in the node is connected to an ingress port and an egress port of the node, a range of wavelengths is converted by the wavelength converter, and whether the wavelength converter is available or occupied.

6. The method according to claim 5, wherein obtaining the node information and the link information of each node from the TLV of the routing protocol message advertised by each node comprises:

in the routing protocol message advertised by each node, obtaining the port cross-connection capability information of the node from a TLV for describing a node attribute, and obtaining the wavelength restriction information and wavelength status information of each link connected to the node from a TLV for describing a link attribute.

7. The method according to claim 6, wherein obtaining the node information and the link information of each node from the TLV of the routing protocol message advertised by each node further comprises:
in the routing protocol message, obtaining the wavelength conversion capability information of the node, the impairment information at node level, and the port to port impairment information inside the node from a TLV for describing a node attribute, and obtaining the link impairment information on each port of the node from a TLV for describing a link attribute.

8. The method according to claim 5, wherein obtaining the node information and the link information of each node from the TLV of the routing protocol message advertised by each node comprises:
in the routing protocol message advertised by each node, obtaining the port cross-connection capability information of the node and the wavelength restriction information and wavelength status information of each link connected to the node from a TLV for describing a link attribute.

9. An apparatus for advertising a routing protocol message in a wavelength division multiplexing network, the apparatus comprising:
an information obtaining unit, configured to obtain node information and link information of a node, wherein the node information comprises port cross-connection capability information of the node, and the link information comprises wavelength restriction information and wavelength status information of each link connected to the node; wherein the information obtaining unit is further configured to obtain at least one of the following: wavelength conversion capability information of the node, impairment information at node level, or port to port impairment information inside the node;
an information advertising unit, configured to carry the obtained node information and link information in a Type-Length-Value of the routing protocol message and advertise a routing protocol message in the network;
wherein the information obtaining unit is further configured to obtain link impairment information on each port of the node; and
wherein the wavelength conversion capability information of the node comprises: whether a wavelength converter in the node is connected to an ingress port and an egress port of the node, a range of wavelengths is converted by the wavelength converter, and whether the wavelength converter is available or occupied.

10. An apparatus for calculating a route in a wavelength division multiplexing network, the apparatus comprising:
an information obtaining unit, configured to obtain node information and link information of each node from a Type-Length-Value of a routing protocol message advertised by each node, wherein the node information comprises port cross-connection capability information of a node, and the link information comprises wavelength restriction information and wavelength status information of each link connected to the node; wherein the obtained node information of each node further comprises at least one of the following: wavelength conversion capability information of the node, impairment information at node level, or port to port impairment information inside the node;
a service receiving unit, configured to receive a request for a service;
a calculation unit, configured to according to the obtained node information and link information, calculate a route satisfying a requirement of the service and assign a wavelength to the service;
wherein the information obtaining unit is further configured to obtain link impairment information on each port of the node; and
wherein the wavelength conversion capability information of the node comprises: whether a wavelength converter in the node is connected to an ingress port and an egress port of the node, a range of wavelengths is converted by the wavelength converter, and whether the wavelength converter is available or occupied.

11. A system for advertising a routing protocol message and calculating a route in a wavelength division multiplexing network, the system comprising:
a routing protocol message advertising apparatus, configured to obtain node information and link information of a node, wherein the node information comprises port cross-connection capability information of the node, and the link information contains wavelength restriction information and wavelength status information of each link connected to the node; and to carry the obtained node information and link information in a Type-Length-Value (TLV) of the routing protocol message and advertise a routing protocol message in the network; wherein the node information of the node further comprises obtaining at least one of the following: wavelength conversion capability information of the node, impairment information at node level, or port to port impairment information inside the node;
a route calculation apparatus, configured to obtain node information and link information of each node from the TLV of the routing protocol message advertised by each node; receive a request for a service; and according to the obtained node information and link information, calculate a route satisfying a requirement of the service and assign a wavelength to the service
wherein the routing protocol messaging apparatus is further configured to obtain link impairment information on each port of the node; and
wherein the wavelength conversion capability information of the node comprises: whether a wavelength converter in the node is connected to an ingress port and an egress port of the node, a range of wavelengths is converted by the wavelength converter, and whether the wavelength converter is available or occupied.

* * * * *